US 9,571,744 B2

(12) United States Patent
Zeng

(10) Patent No.: US 9,571,744 B2
(45) Date of Patent: Feb. 14, 2017

(54) VIDEO PROCESSING METHOD AND APPARATUS

(71) Applicant: SHENZHEN CHINA STAR OPTOELECTRONICS TECHNOLOGY CO., LTD., Guangdong (CN)

(72) Inventor: Yuchao Zeng, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 183 days.

(21) Appl. No.: 14/408,894

(22) PCT Filed: Oct. 14, 2014

(86) PCT No.: PCT/CN2014/088545
§ 371 (c)(1),
(2) Date: Dec. 17, 2014

(87) PCT Pub. No.: WO2016/041225
PCT Pub. Date: Mar. 24, 2016

(65) Prior Publication Data
US 2016/0277657 A1 Sep. 22, 2016

(30) Foreign Application Priority Data
Sep. 17, 2014 (CN) .......................... 2014 1 0475034

(51) Int. Cl.
G06K 9/40 (2006.01)
H04N 5/235 (2006.01)
(Continued)

(52) U.S. Cl.
CPC ............... H04N 5/2354 (2013.01); G06T 5/00 (2013.01); G09G 3/2011 (2013.01);
(Continued)

(58) Field of Classification Search
CPC ............ H04N 5/202; H04N 5/21; H04N 9/30; H04N 9/646; H04N 5/235–5/2354; H04N 5/243; H04N 5/351; H04N 5/52–5/53; H04N 5/57; H04N 9/71; H04N 9/77; H04N 13/0025; H04N 21/4854; G06T 5/00; G06T 2207/20172; G06T 2207/00; G09G 3/34; G09G 3/3406; G09G 3/3426; G09G 5/02; G09G 2320/0271; G09G 2320/16; G09G 3/2011; G09G 3/3611; G09G 2320/02; G09G 2320/0233; G09G 2320/0242; G09G 2320/062–2320/0686; G09G 2340/0428; G09G 2360/16
See application file for complete search history.

(56) References Cited

U.S. PATENT DOCUMENTS 8,625,031 B2 * 1/2014 Noutoshi ................. G09G 5/02
348/630
8,964,124 B2 * 2/2015 Fujine .................. G09G 3/3406
345/102

(Continued)

FOREIGN PATENT DOCUMENTS

CN 103380451 A 10/2013
CN 103930943 A 7/2014

Primary Examiner — Jose Couso
(74) Attorney, Agent, or Firm — Osha Liang LLP

(57) ABSTRACT

A video processing method and an apparatus using the same are disclosed. The method includes steps of performing a brightness-reducing treatment on all pixels in a displayed image; performing a brightness-enhancing treatment on all first pixels in the displayed image; performing a brightness-smoothing treatment on pixels having a brightness value being between a higher smooth-treatment brightness value and a lower smooth-treatment brightness value. The video processing method keeps the brightness value of the pixels from being out of grayscale range.

10 Claims, 5 Drawing Sheets

(51) Int. Cl.
  *G06T 5/00* (2006.01)
  *G09G 3/20* (2006.01)
  *G09G 3/36* (2006.01)

(52) U.S. Cl.
  CPC .. *G09G 3/3611* (2013.01); *G06T 2207/20172* (2013.01); *G09G 2320/0242* (2013.01); *G09G 2320/0271* (2013.01); *G09G 2340/0428* (2013.01)

(56) References Cited

U.S. PATENT DOCUMENTS

| | | | |
|---|---|---|---|
| 9,350,961 B2* | 5/2016 | Fujine | G09G 3/3426 |
| 2013/0278830 A1 | 10/2013 | Noutoshi et al. | |
| 2014/0300819 A1 | 10/2014 | Fujine et al. | |

* cited by examiner

VIDEO PROCESSING METHOD AND APPARATUS

BACKGROUND OF THE INVENTION

Field of the Invention

The present invention relates to the field of liquid crystal display technology, and more particularly to a video processing method and a video processing apparatus utilizing the video process method.

Description of the Related Art

Currently, the demand for improving image quality is increasing, and therefore many video processing methods have been developed to increase the contrast of a display apparatus. One of the most common methods is to perform an enhancing treatment on pixel images whose brightness value is not within a certain range in an inputting video signal, and then perform a compressing treatment on all pixel images of the displayed image. However, the pixel images obtained by such method may exceed the grayscale range that the display apparatus could display, and therefore those who exceed the grayscale range will need to be abandoned. Thus, the saturation degree of the displayed image will be reduced, thereby causing color shift and then affecting visual quality.

Therefore, it is necessary to provide a video processing method and a video processing apparatus utilizing the video process method to overcome the problems existing in the conventional technology.

SUMMARY OF THE INVENTION

An object of the present invention is to provide a video processing method and a video processing apparatus utilizing the video process method so as to reduce color shifting in the displayed image.

In order to solve the foregoing technical problem, the present invention provides a video processing method having steps of:

obtaining a pixel-brightness average value, a brightest pixel and a brightness-enhancing threshold value based on the brightness value of all pixels in a displayed image; and obtaining the number of low-brightness pixels according to the brightness value of all the pixels in the displayed image and a brightness-distinguishing setting value, wherein the low-brightness pixels are pixels having a brightness value less than the brightness-distinguishing setting value;

using a first setting attenuation coefficient to perform a brightness-reducing treatment on all the pixels in the displayed image when the number of the low-brightness pixels is greater than a predetermined number setting value;

determining an attenuation coefficient based on the pixel brightness average value and using the attenuation coefficient to perform a brightness-reducing treatment on all the pixels in the displayed image when the number of the low-brightness pixels is less than or equal to the predetermined number setting value;

using a preset gain coefficient to perform a brightness-enhancing treatment on all first pixels in the displayed image when the brightness value of the brightest pixel is less than or equal to the first brightness threshold value; wherein the first pixels belong to the pixels in the displayed image, wherein the first pixels are pixels having a brightness value being greater than the brightness-enhancing threshold value;

determining a gain coefficient based on the pixel brightness average value and using the gain coefficient to perform the brightness-enhancing treatment on all the first pixels when the brightness value of the brightest pixel is greater than the first brightness threshold value; and respectively setting a higher smooth-treatment brightness value and a lower smooth-treatment brightness value and performing a brightness-smoothing treatment on pixels having a brightness value being between the higher smooth-treatment brightness value and the lower smooth-treatment brightness value; wherein the higher smooth-treatment brightness value is greater than the brightness-enhancing threshold value, and the lower smooth-treatment brightness value is less than the brightness-enhancing threshold value.

In one embodiment of the video processing method of the present invention, the step of determining the attenuation coefficient based on the pixel brightness average value further includes steps of:

presetting a first average threshold value and a second average threshold value;

comparing the pixel brightness average value respectively with the first average threshold value and the second average threshold value, wherein when the pixel brightness average value is less than or equal to the first average threshold value, the attenuation coefficient is a preset second setting attenuation coefficient; or when the pixel brightness average value is greater than the first average threshold value and less than the second average threshold value, a coefficient of proportionality representing the attenuation coefficient changes in proportion with the pixel brightness average value is represented as:

$$(1-m)/(g2-g1); \text{ wherein}$$

$g1$ is the first average threshold value; $g2$ is the second average threshold value, wherein $g2>g1$; and $m$ is the second setting attenuation coefficient, wherein $0<m<1$; or when the pixel brightness average value is greater than or equal to the second average threshold value, the attenuation coefficient is equal to 1.

In one embodiment of the video processing method of the present invention, the step of determining the gain coefficient based on the pixel brightness average value further includes steps of:

presetting a first average threshold value and a second average threshold value;

comparing the pixel brightness average value respectively with the first average threshold value and the second average threshold value, wherein when the pixel brightness average value is less than or equal to the first average threshold value, the gain coefficient has a preset maximum value; or when the pixel brightness average value is greater than the first average threshold value and is less than the second average threshold value, a coefficient of proportionality representing the gain coefficient changes in proportion with the pixel brightness average value is represented as:

$$(1-gmax)/(g2-g1); \text{ wherein}$$

$g1$ is the first average threshold value; $g2$ is the second average threshold value, wherein $g2>g1$; $gmax$ is the preset maximum value of the gain coefficient, wherein $gmax>1$; or when the pixel brightness average value is greater than or equal to the second average threshold value, the gain coefficient is equal to 1.

In one embodiment of the video processing method of the present invention, when the first brightness threshold value is greater than the brightness value of the brightest pixel, the range of the gain coefficient is:

$1<k<(f/n)$; or when the first brightness threshold value is less than or equal to the brightness value of the brightest pixel, the range of the gain coefficient is:

$1<k<(f/m)$; wherein k is the gain coefficient; f is the maximum brightness value a display apparatus has; m is the brightness value of the brightest pixel; and n is the first brightness threshold value.

The present invention further provides a video process method having steps of obtaining a pixel-brightness average value, a brightest pixel and a brightness-enhancing threshold value based on the brightness value of all pixels in a displayed image; and obtaining the number of low-brightness pixels according to the brightness value of all the pixels in the displayed image and a brightness-distinguishing setting value, wherein the low-brightness pixels are pixels having a brightness value less than the brightness-distinguishing setting value;

performing a brightness-reducing treatment on all the pixels in the displayed image based on the pixel brightness average value and the number of the low-brightness pixels;

performing a brightness-enhancing treatment on all first pixels in the displayed image based on the brightness value of the brightest pixel and the pixel brightness average value, wherein the first pixels belong to the pixels in the displayed image, wherein the first pixels are pixels having a brightness value being greater than the brightness-enhancing threshold value; and respectively setting a higher smooth-treatment brightness value and a lower smooth-treatment brightness value and performing a brightness-smoothing treatment on pixels having a brightness value being between the higher smooth-treatment brightness value and the lower smooth-treatment brightness value; wherein the higher smooth-treatment brightness value is greater than the brightness-enhancing threshold value, and the lower smooth-treatment brightness value is less than the brightness-enhancing threshold value.

In one embodiment of the video processing method of the present invention, the step of performing the brightness-reducing treatment on all the pixels in the displayed image further includes steps of:

when the number of the low-brightness pixels is greater than a presetting number setting value, using a presetting first setting attenuation coefficient to perform the brightness-reducing treatment on all the pixels in the displayed image; or when the number of the low-brightness pixels is less than or equal to the number setting value, determining an attenuation coefficient based on the pixel brightness average value and using the attenuation coefficient to perform the brightness-reducing treatment on all the pixels in the displayed image.

In one embodiment of the video processing method of the present invention, the step of determining the attenuation coefficient based on the pixel brightness average value further include steps of:

presetting a first average threshold value and a second average threshold value;

comparing the pixel brightness average value respectively with the first average threshold value and the second average threshold value, wherein when the pixel brightness average value is less than or equal to the first average threshold value, the attenuation coefficient is equal to the second setting attenuation coefficient;

when the pixel brightness average value is greater than the first average threshold value and less than the second average threshold value, a coefficient of proportionality representing the attenuation coefficient changes in proportion with the pixel brightness average value is represented as:

$(1-m)/(g2-g1)$;

g1 is the first average threshold value; g2 is the second average threshold value, wherein g2>g1; and m is the second setting attenuation coefficient, wherein 0<m<1; or when the pixel brightness average value is greater than or equal to the second average threshold value, the attenuation coefficient is equal to 1.

In one embodiment of the video processing method of the present invention, the step of performing the brightness-enhancing treatment on all first pixels in the displayed image further includes steps of:

when the brightness value of the brightest pixel is less than or equal to the first brightness threshold value, using a preset gain coefficient to perform a brightness-enhancing treatment on all first pixels in the displayed image; or when the brightness value of the brightest pixel is greater than the first brightness threshold value, determining a gain coefficient based on the pixel brightness average value and using the gain coefficient to perform the brightness-enhancing treatment on all the first pixels.

In one embodiment of the video processing method of the present invention, the step of determining the gain coefficient based on the pixel brightness average value further includes steps of:

presetting a first average threshold value and a second average threshold value;

comparing the pixel brightness average value respectively with the first average threshold value and the second average threshold value, wherein when the pixel brightness average value is less than or equal to the first average threshold value, the gain coefficient is a preset maximum value; or when the pixel brightness average value is greater than the first average threshold value and less than the second average threshold value, a coefficient of proportionality representing the gain coefficient changes in proportion with the pixel brightness average value is represented as:

$(1-g\max)/(g2-g1)$; wherein g1 is the first average threshold value; g2 is the second average threshold value, wherein g2>g1; gmax is the preset maximum value of the gain coefficient, wherein gmax>1; or when the pixel brightness average value is greater than or equal to the second average threshold value, the gain coefficient is equal to 1.

In one embodiment of the video processing method of the present invention, when the first brightness threshold value is greater than the brightness value of the brightest pixel, the range of the gain coefficient is:

$1<k<(f/n)$; or when the first brightness threshold value is less than or equal to the brightness value of the brightest pixel, the range of the gain coefficient is:

$1<k<(f/m)$; wherein k is the gain coefficient; f is the maximum brightness value a display apparatus has; m is the brightness value of the brightest pixel; and n is the first brightness threshold value.

Another object of the present invention is to provide a video processing apparatus which includes: a retrieve module being used to retrieve a pixel-brightness average value, the brightest pixel and a brightness-enhancing threshold value based on the brightness value of all pixels in a displayed image, and retrieve the number of low-brightness pixels based on the brightness value of all pixels and a preset brightness-distinguishing setting value; wherein the low-brightness pixel is a pixel having a brightness value lower than the brightness-distinguishing setting value; a brightness-reducing module being used to perform a brightness-reducing treatment on all the pixels in the displayed image based on the pixel brightness average value and the number of the low-brightness pixels; a brightness-enhancing module being used to perform a brightness-enhancing treatment on all first pixels in the displayed image based on the brightness value of the brightest pixel and the pixel brightness average value, wherein the first pixels belong to the pixels in the displayed image, wherein the first pixels are pixels having a brightness value greater than the brightness-enhancing threshold value; and a brightness-smoothing treatment module being used to set a higher smooth-treatment brightness value and a lower smooth-treatment brightness value to perform a brightness-smoothing treatment on the pixels having a brightness value being between the higher smooth-treatment brightness value and the lower smooth-treatment brightness value; wherein the higher smooth-treatment brightness value is higher than the brightness-enhancing threshold value, and the lower smooth-treatment brightness value is lower than the brightness-enhancing threshold value.

In one embodiment of the video processing apparatus of the present invention, when the number of low-brightness pixels is greater than a number setting value, the brightness-reducing module uses a first setting attenuation coefficient to perform the brightness-reducing treatment on all the pixels in the displayed image; or when the number of low-brightness pixels is less than or equal to the number setting value, the brightness-reducing module determines an attenuation coefficient based on the pixel brightness average value and uses the attenuation coefficient to perform the brightness-reducing treatment on all the pixels in the displayed image.

In one embodiment of the video processing apparatus of the present invention, the brightness-reducing module is further used to preset a first average threshold value and a second average threshold value, and then compare the pixel brightness average value respectively with the first average threshold value and the second average threshold value, wherein when the pixel brightness average value is less than or equal to the first average threshold value, the attenuation coefficient is set as a predetermined second setting attenuation coefficient; or when the pixel brightness average value is greater than the first average threshold value and less than the second average threshold value, a coefficient of proportionality representing the attenuation coefficient changes in proportion with the pixel brightness average value is represented as:

$(1-m)/(g2-g1)$, wherein g1 is the first average threshold value; g2 is the second average threshold value, wherein $g2>g1$; m is the second setting attenuation coefficient, wherein $0<m<1$; or when the pixel brightness average value is greater than or equal to the second average threshold value, the attenuation coefficient is 1.

In one embodiment of the video processing apparatus of the present invention, when the brightness value of the brightest pixel is less than or equal to the first brightness threshold value, the brightness-enhancing module uses a preset gain coefficient to perform a brightness-enhancing treatment on all the first pixels in the displayed image; or when the brightness value of the brightest pixel is greater than the first brightness threshold value, the brightness-enhancing module determines a gain coefficient based on the pixel brightness average value and uses the gain coefficient to perform the brightness-enhancing treatment on all the first pixels.

In one embodiment of the video processing apparatus of the present invention, the brightness-enhancing module is further used to preset a first average threshold value and a second average threshold value, and then compare the pixel brightness average value respectively with the first average threshold value and the second average threshold value, wherein when the pixel brightness average value is less than or equal to the first average threshold value, the gain coefficient is a preset maximum value; or when the pixel brightness average value is greater than the first average threshold value and less than the second average threshold value, a coefficient of proportionality representing the gain coefficient changes in proportion with the pixel brightness average value is represented as:

$(1-gmax)/(g2-g1)$; wherein g1 is the first average threshold value; g2 is the second average threshold value, wherein $g2>g1$; gmax is the preset maximum value of the gain coefficient, wherein $gmax>1$; or when the pixel brightness average value is greater than or equal to the second average threshold value, the gain coefficient is equal to 1.

In one embodiment of the video processing apparatus of the present invention, when the first brightness threshold value is greater than the brightness value of the brightest pixel, the range of the gain coefficient is:

$1<k<(f/n)$; or when the first brightness threshold value is less than or equal to the brightness value of the brightest pixel, the range of the gain coefficient is:

$1<k<(f/m)$; wherein k is the gain coefficient; f is the maximum brightness value a display apparatus has; m is the brightness value of the brightest pixel; and n is the first brightness threshold value.

The video processing method of the present invention first performs the brightness-reducing treatment, and then performs the brightness-enhancing treatment so as to keep the brightness of all pixels from being out of the range of grayscale, and further performs brightness-smoothing treatment to solve the color shifting problem occurring in the displayed image.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
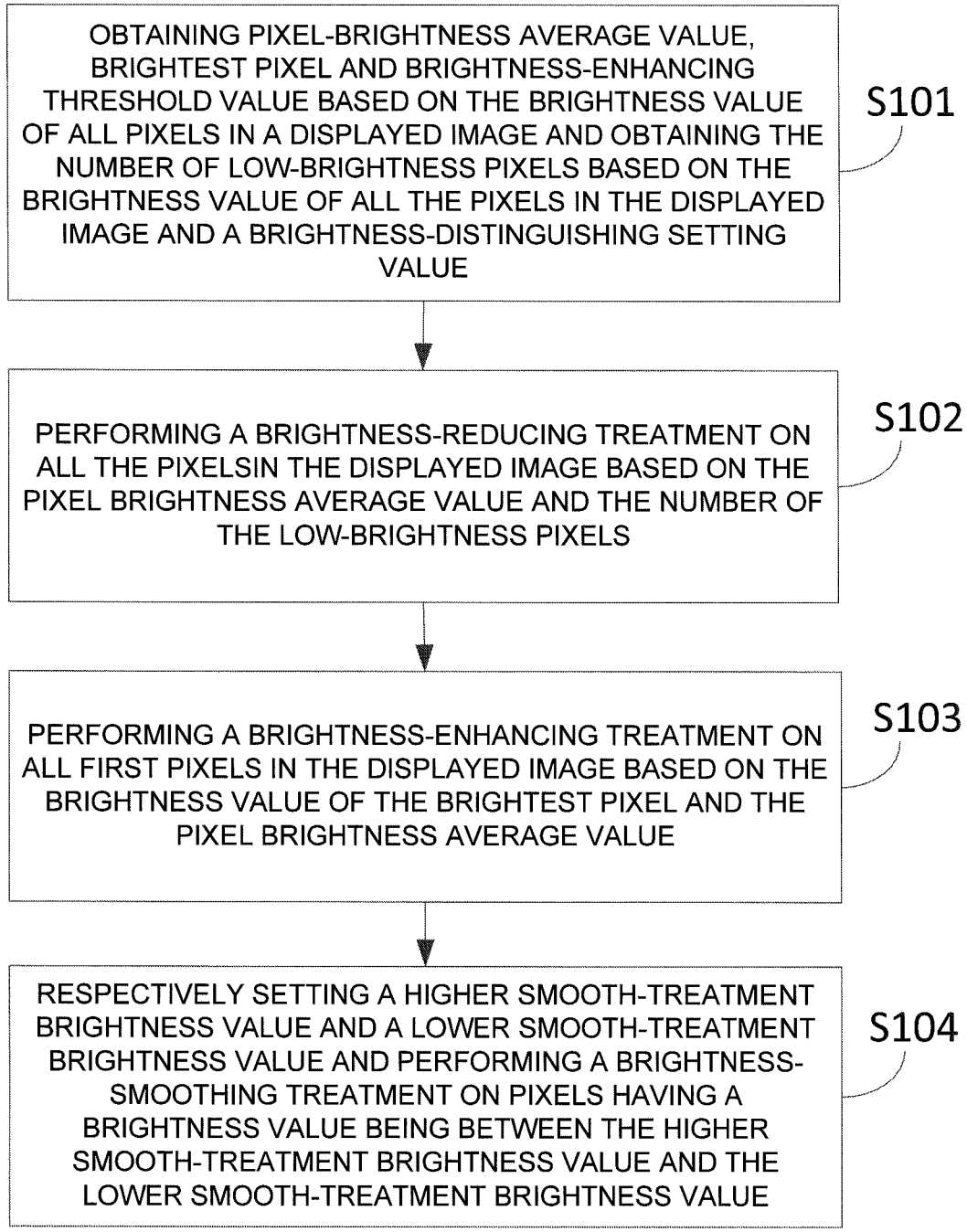
FIG. 1 is a flow chart of a video processing method according to a first embodiment of the present invention.

Please refer to FIG. 1, which is a flow chart of a video processing method according to a first embodiment of the present invention.

As shown in FIG. 1, the video processing method of the present invention includes the following steps:

Step S101: calculating a pixel brightness average value, finding a brightest pixel, and calculating a brightness-enhancing threshold value based on brightness values of all pixels in a displayed image; and counting the number of low-brightness pixels based on the brightness values of all pixels in the displayed image and a brightness-distinguishing setting value.

When the brightness values of all pixels in the displayed image are known, the pixel brightness average value, the brightest pixel and the brightness-enhancing threshold value can be obtained by calculating. For example, it can be achieved by generating a histogram based on the displayed image so that the pixel brightness average value and the brightest pixel can be obtained from this histogram. Besides, the number of the low-brightness pixels that have lower brightness values can be obtained based on the brightness values of all the pixels in the displayed image and the brightness-distinguishing setting value. The brightness-distinguishing setting value is predetermined according to the display effect of the displayed image; when the displayed image is brighter, the brightness-distinguishing setting value is higher; when the displayed image is darker, the brightness-distinguishing setting value is lower, wherein the low-brightness pixel is a pixel having a brightness value lower than the brightness-distinguishing setting value. For example, the brightness value of the brightest pixel may be 100, and the brightness-distinguishing setting value may be 32, wherein the pixel which has a brightness value being lower than 32 is the low-brightness pixel.

The brightness-enhancing threshold value may be calculated based on the pixel brightness average value in accordance with the following formula 1:

$$thresh = ave + N\sigma \quad \text{Formula (1),}$$ wherein

"thresh" is the brightness-enhancing threshold value, "ave" is the pixel brightness average value, "N" is a constant, and $\sigma$ is the standard deviation of pixel brightness.

Step S102: performing a brightness-reducing treatment on all pixels in the displayed image according to the pixel brightness average value and the number of the low-brightness pixels.

Figure 2:
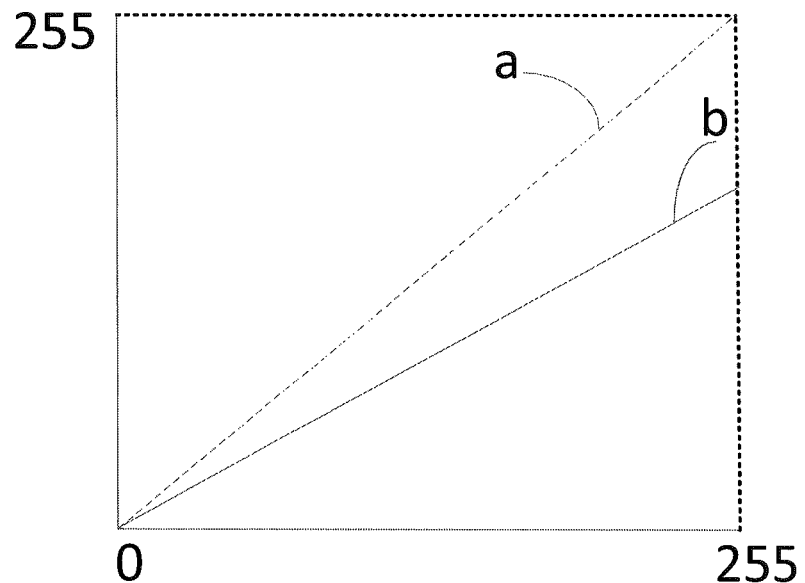
FIG. 2 is a schematic diagram showing grayscale comparison before/after performing a brightness-reducing treatment according to a preferred embodiment of the present invention.

After obtaining the pixel brightness average value and the number of low-brightness pixels according to Step S101, a brightness-reducing treatment is then performed on the brightness of all pixels in the displayed image. For easy understanding, the following embodiment is described in detail in connection with accompanying drawings. FIG. 2 shows a grayscale comparison before/after performing the brightness-reducing treatment. Assume that a grayscale value is between 0 and 255, since the grayscale value corresponds to the brightness value (the higher the grayscale value is, the higher the brightness value will be), the change of brightness can be learned from the change of grayscale. As shown in FIG. 2, abscissa represents inputted grayscale (brightness) of all pixels in the displayed image, and ordinate shows outputted grayscale (brightness) of all pixels in the display image; wherein the line "a" represents the brightness of all pixels in the displayed image that are not processed by the brightness-reducing treatment, and the line "b" represents the brightness of all pixels in the displayed image that have been processed by the brightness-reducing treatment. It is not hard to realize that the output amplitude shown by line "b" is relatively lower than the output amplitude shown by line "a".

Since the pixel brightness average value and the number of low-brightness pixels are integrated for performing the brightness-reducing treatment on all pixels in the displayed image, when there are too much low-brightness pixels, a problem where the displayed image becomes indistinct due to the brightness being reduced too much can be avoided.

Step S103: performing a brightness-enhancing treatment on all first pixels in the displayed image based on the brightness of the brightest pixel and the pixel brightness average value.

In more details, this step is comparing the brightness value of all pixels in the displayed image with the brightness-enhancing threshold value, wherein the pixels whose brightness value is greater than the brightness-enhancing threshold value are referred to as the first pixels; then performing the brightness-enhancing treatment on all the first pixels after the foregoing brightness-reducing treatment.

Figure 3:
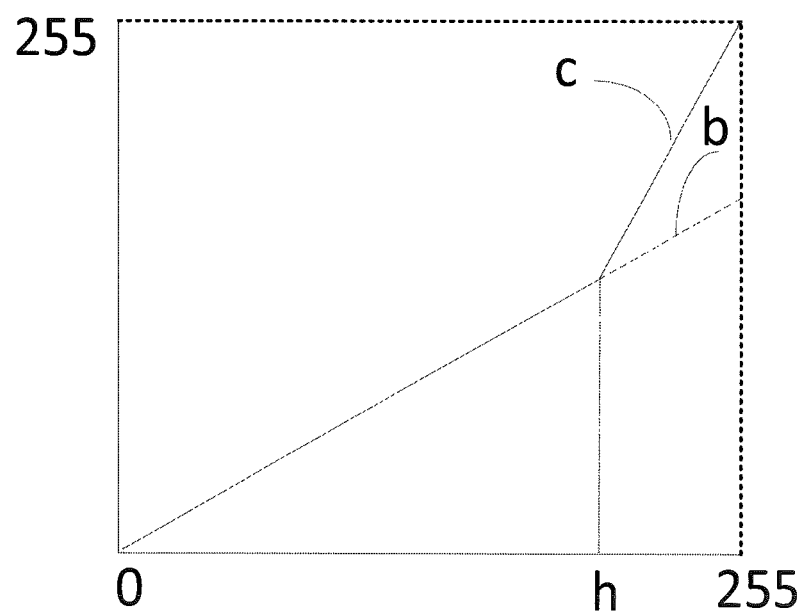
FIG. 3 is a schematic diagram showing grayscale comparison before/after performing a brightness-enhancing treatment according to a preferred embodiment of the present invention.

For easy understanding, the following embodiment is described in detail in connection with accompanying drawings. FIG. 3 shows a grayscale comparison before/after performing a brightness-enhancing treatment.

As shown in FIG. 3, assume that a grayscale value is between 0 and 255, abscissa represents inputted grayscale (brightness) of all pixels in the displayed image, and ordinate shows outputted grayscale (brightness) of all pixels in the display image; wherein the line "b" represents the brightness of all pixels in the displayed image that have been processed by the brightness-reducing treatment; the line "c" represents the brightness of the first pixels in the displayed image that have been processed by the brightness-enhancing treatment; and the grayscale value to which the brightness-enhancing threshold value corresponds is "h". Since the brightness of the pixels at the dotted part of line "b" is greater than the brightness-enhancing threshold value, those pixels are referred to as the foregoing first pixels. According to the foregoing step, only the first pixels will be processed by the brightness-enhancing treatment; therefore, those first pixels will have a brightness value being shown as line "c". It is clear that the brightness value of the first pixels after being processed by the brightness-enhancing treatment is greater than the brightness value of the first pixels before being processed by the brightness-enhancing treatment.

Since the brightness value of the brightest pixel and the pixel brightness average value are considered together on performing the brightness-enhancing treatment on all the pixels in the displayed image, when there are too much non-low-brightness pixels, it can avoid a problem of over-enhancing the brightness of the pixel on brightness which may lead to distortion of the displayed image.

Step S104: respectively setting a higher smooth-treatment brightness value and a lower smooth-treatment brightness value to perform a brightness-smoothing treatment on the pixels which have a brightness value being between the higher smooth-treatment brightness value and the lower smooth-treatment brightness value; wherein the higher smooth-treatment brightness value is higher than the brightness-enhancing threshold value; and the lower smooth-treatment brightness value is lower than the brightness-enhancing threshold value.

Since in step S103 the increase rate of the brightness of the pixels near the brightness-enhancing threshold value (near the "h" point) changes dramatically, a color shifting problem may occur in the displayed image. Therefore, it is necessary to perform a brightness-smoothing treatment on those pixels near the brightness-enhancing threshold value (near the "h" point).

Figure 4:
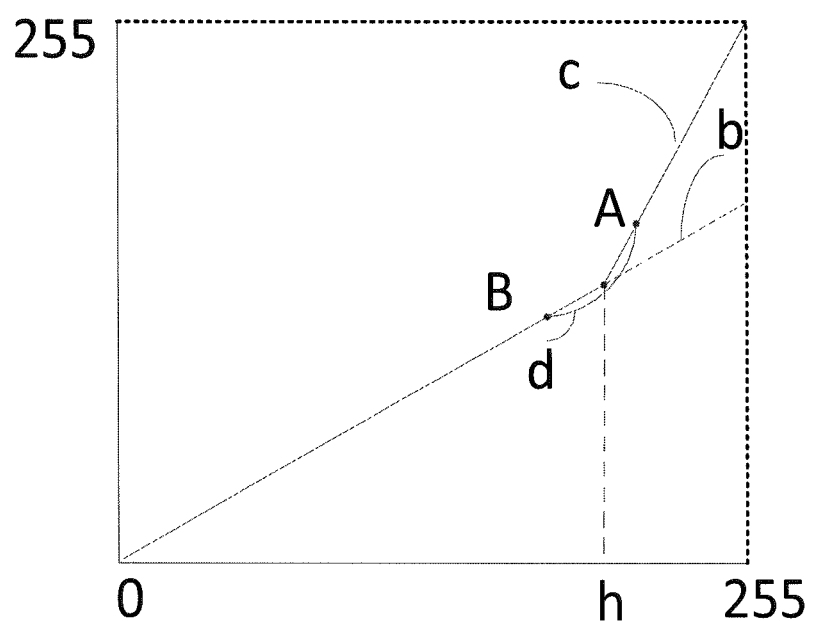
FIG. 4 is a schematic diagram showing performing a brightness-smoothing treatment according a preferred embodiment of the present invention.

FIG. 4 shows a schematic view of performing the brightness-smoothing treatment. In FIG. 4, the abscissa represents inputted grayscale (brightness) of all pixels in the displayed image, and the ordinate shows outputted grayscale (brightness) of all pixels in the display image. The brightness-smoothing treatment is implemented by choosing a lower smooth-treatment brightness value for the pixel whose brightness is lower than the brightness-enhancing threshold value (for example, point B in FIG. 4), and choosing a higher smooth-treatment brightness value for the pixel whose brightness is higher than the brightness-enhancing threshold value (for example, point A in FIG. 4), and then forming a parabolic curve "d" that passes through the point B and A and opens upward. Since along the parabolic curve "d" the increase rate of the brightness of the pixels changes relatively slowly, the problem where the increase rate of the brightness of the pixels near the brightness-enhancing threshold value (near the "h" point) changes dramatically is overcome, thereby solving the color shifting problem occurring in the displayed image.

As described above, the video processing method of the present invention first performs the brightness-reducing treatment, and then performs the brightness-enhancing treatment so as to keep the brightness of all pixels from being out of the range of grayscale, and further performs brightness-smoothing treatment to solve the color shifting problem occurring in the displayed image.

Figure 5:
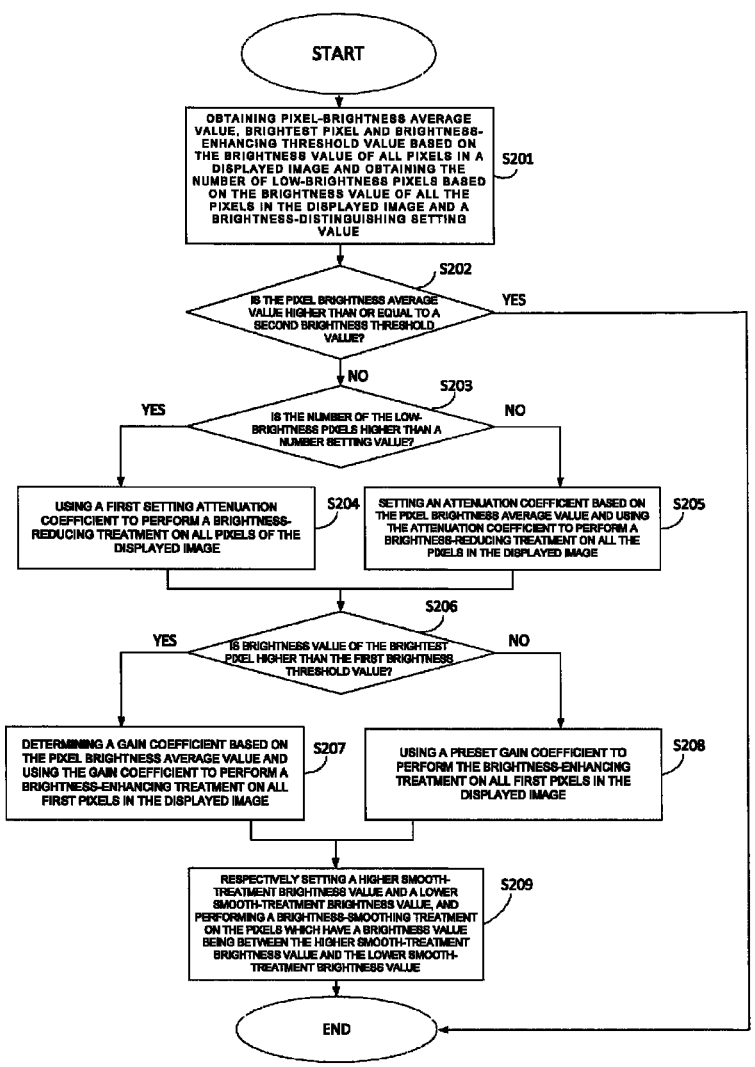
FIG. 5 is another flow chart of the video processing method according to a second embodiment of the present invention.

With reference to FIG. 5, FIG. 5 is another flow chart of the video processing method according to a second embodiment of the present invention.

As shown in FIG. 5, the video processing method of the present invention includes the following steps:

Step S201: calculating a pixel-brightness average value, finding a brightest pixel, and calculating a brightness-enhancing threshold value based on brightness values of all pixels in a display image; and counting the number of low-brightness pixels based on the brightness values of all pixels in the displayed image and a brightness-distinguishing setting value.

When the brightness values of all pixels in the displayed image are known, the pixel brightness average value, the brightest pixel and the brightness-enhancing threshold value can be obtained by calculating. For example, it can be achieved by generating a histogram based on the displayed image so that the pixel brightness average value and the brightest pixel can be obtained from this histogram. Besides, the number of the low-brightness pixels that have lower brightness values can be obtained based on the brightness values of all the pixels in the displayed image and the brightness-distinguishing setting value. The brightness-distinguishing setting value is predetermined according to the display effect of the displayed image; when the displayed image is brighter, the brightness-distinguishing setting value is higher; when the displayed image is darker, the brightness-distinguishing setting value is lower, wherein the low-brightness pixels are pixels having a brightness value lower than the brightness-distinguishing setting value. For example, the brightness value of the brightest pixel may be 100, and the brightness-distinguishing setting value may be 32, wherein the pixel which has a brightness value being lower than 32 is the low-brightness pixel.

The brightness-enhancing threshold value may be calculated based on the pixel brightness average value in accordance with the following formula 1:

$$\text{thresh}=\text{ave}+N\sigma \qquad \text{Formula (1), wherein}$$

"thresh" is the brightness-enhancing threshold value, "ave" is the pixel brightness average value, "N" is a constant, and $\sigma$ is the standard deviation of pixel brightness.

Step S202: determining whether or not the pixel brightness average value is higher than or equal to a second brightness threshold value.

That is, to determine whether or not the whole displayed image should be processed by a contrast-enhancing treatment. The second brightness threshold value is a predetermined value, which may be, for example, set based on visual perception of human eye. When the pixel brightness average value in the displayed image is higher than or equal to the second brightness threshold value, the video processing method then come to an end. When the pixel brightness average value in the displayed image is lower than the second brightness threshold value, the video processing method then goes to the next step S203.

Step S203: determining whether or not the number of the low-brightness pixels is higher than a number setting value.

The low-brightness pixels are pixels having a brightness value lower than the brightness-distinguishing setting value. When the number of the low-brightness pixels is higher than the number setting value, the video processing method then proceeds to Step S024. When the number of the low-brightness pixels is lower than or equal to the number setting value, the video processing method then proceeds to Step S205.

Step S204: when the number of the low-brightness pixels is higher than the number setting value, using a first setting attenuation coefficient to perform a brightness-reducing treatment on all pixels of the displayed image; wherein the first setting attenuation coefficient is set based on the displayed effect of the displayed image.

Step S205: when the number of the low-brightness pixels is less than or equal to the number setting value, setting an attenuation coefficient based on the pixel brightness average value and using the attenuation coefficient to perform a brightness-reducing treatment on all the pixels in the displayed image.

The step S205 specifically includes steps of presetting a first average threshold value and a second average threshold value (the second average threshold value is greater than the first average threshold value); and comparing the pixel brightness average value respectively with the first average threshold value and the second average threshold value:

When the pixel brightness average value is less than or equal to the first average threshold value, the attenuation coefficient is a second setting attenuation coefficient; wherein the second setting attenuation coefficient is set based on the display effect of the displayed image. The second setting attenuation coefficient is lower than 1 and higher than 0.

When the pixel brightness average value is greater than the first average threshold value and less than the second average threshold value, a coefficient of proportionality representing the attenuation coefficient changes in proportion with the pixel brightness average value is represented as the following formula 2:

$$(1-m)/(g2-g1); \quad \text{Formula (2), wherein}$$

"g1" is the first average threshold value; "g2" is the second average threshold value, wherein g2>g1; m is the second setting attenuation coefficient, wherein 0<m<1;

When the pixel brightness average value is higher than or equal to the the second average threshold value, the attenuation coefficient is 1.

Since the pixel brightness average value and the number of the low-brightness pixels are considered together for determining the attenuation coefficient, when there are too much low-brightness pixels, it can prevent the attenuation coefficient from being too great that distortion may occur in the displayed image.

The specific process of the brightness-reducing treatment is as follows: with the attenuation coefficient obtained from step S204 or S205, all pixels in the displayed image can be processed by the brightness-reducing treatment; for example, the treatment may be multiplying the brightness value of all pixels in the displayed image by the attenuation coefficient. For easy understanding, the following embodiment is described in detail in connection with accompanying drawings. In connection with FIG. 2, assume that a grayscale value is between 0 and 255, since the grayscale value corresponds to the brightness value (the higher the grayscale value is, the higher the brightness value will be), the change of brightness can be learned from the change of grayscale. As shown in FIG. 2, the abscissa therein represents inputted grayscale (brightness) of all pixels in the displayed image, and the ordinate therein shows outputted grayscale (brightness) of all pixels in the display image; wherein the line "a" represents the brightness of all pixels in the displayed image that are not processed by the brightness-reducing treatment, and the line "b" represents the brightness of all pixels in the displayed image that have been processed by the brightness-reducing treatment. It is not hard to realize that the output amplitude shown by line "b" is relatively lower than the output amplitude shown by line "a".

Step S206: determining whether or not the brightness value of the brightest pixel is higher than the first brightness threshold value.

According to the outcome, when the brightness value of the brightest pixel is greater than the first brightness threshold value, the video processing method proceeds to the following step S207; when the brightness value of the brightest pixel is less than or equal to the first brightness threshold value, the video processing method proceeds to the following Step S208. The first brightness threshold value is determined according to the display effect of the displayed image.

Step S207: when the brightness value of the brightest pixel is greater than the first brightness threshold value, determining a gain coefficient based on the pixel brightness average value and using the gain coefficient to perform a brightness-enhancing treatment on all the first pixels in the displayed image.

Step S207 specifically includes the following steps of presetting a first average threshold value and a second average threshold value (the second average threshold value is greater than the first average threshold value); and comparing the pixel brightness average value respectively with the first average threshold value and the second average threshold value:

When the pixel brightness average value is less than or equal to the first average threshold value, the gain coefficient will be a maximum value;

When the pixel brightness average value is greater than the first average threshold value and less than the second average threshold value, a coefficient of proportionality representing the gain coefficient changes in proportion with the pixel brightness average value is represented as the following formula 3:

$$(1-gmax)/(g2-g1); \quad \text{Formula (3), wherein}$$

"g1" is the first average threshold value, "g2" is the second average threshold value, wherein g2>g1; "gmax" is the maximum gain coefficient, wherein gmax>1;

When the pixel brightness average value is greater than or equal to the second average threshold value, the gain coefficient of the brightness-enhancing module is 1.

When the first brightness threshold value is greater than the brightness of the brightest pixel, the range of the gain coefficient is:

$$1<k<(f/n);$$

When the first brightness threshold value is less than or equal to the brightness of the brightest pixel, the range of the gain coefficient is:

$$1<k<(f/m); \text{ wherein}$$

"k" is the gain coefficient; "f" is the maximum brightness value of the display apparatus (that is, the maximum brightness the display apparatus could display); "m" is the brightness value of the brightest pixel; and "n" is the first brightness threshold value.

Since the brightness of the brightest pixel and the pixel brightness average value are considered together for determining the gain coefficient, when there are too much non-low-brightness pixels, it can prevent the gain coefficient from being too great that the brightness value of the pixels in the displayed image is out of the range of grayscale, which may affect the display effect of the displayed image.

Step S208: when the brightness value of the brightest pixel is less than or equal to the first brightness threshold value, using a preset gain coefficient to perform the brightness-enhancing treatment on all first pixels in the displayed image, wherein the preset gain coefficient is decided based on the display effect of the displayed image.

The specific process of the brightness-enhancing treatment is as follows: with the gain coefficient obtained from step S207 or S208, all the first pixels in the displayed image can be processed by the brightness-enhancing treatment; for example, the treatment may be multiplying the brightness value of all the first pixels in the displayed image by the gain coefficient.

In more details, this step is comparing the brightness value of all pixels in the displayed image with the brightness-enhancing threshold value, wherein the pixels whose brightness value is greater than the brightness-enhancing threshold value are referred to as the first pixels; then performing the brightness-enhancing treatment on all the first pixels after the foregoing brightness-reducing treatment.

For easy understanding, the following embodiment is described in detail in connection with accompanying drawings. In connection with FIG. 3, the line "b" represents the brightness of all pixels in the displayed image that have been processed by the brightness-reducing treatment; the line "c" represents the brightness of the first pixels in the displayed image that have been processed by the brightness-enhancing treatment; and the grayscale value to which the brightness-enhancing threshold value corresponds is "h". Since the brightness of the pixels at the dotted part of line "b" is greater than the brightness-enhancing threshold value, only those pixels will be processed by the brightness-enhancing treatment; therefore, those first pixels will have a brightness value being shown as line "c". It is clear that the brightness value of the first pixels after being processed by the brightness-enhancing treatment is greater than the brightness value of the first pixels before being processed by the brightness-enhancing treatment.

Step S209: respectively setting a higher smooth-treatment brightness value and a lower smooth-treatment brightness value, and performing a brightness-smoothing treatment on the pixels which have a brightness value being between the higher smooth-treatment brightness value and the lower smooth-treatment brightness value; wherein the higher smooth-treatment brightness value is greater than the brightness-enhancing threshold value; and the lower smooth-treatment brightness value is less than the brightness-enhancing threshold value.

With reference to FIG. 4, since in step S207 or S208 the increase rate of the brightness of the pixels near the brightness-enhancing threshold value (near the "h" point) changes dramatically, a color shifting problem may occur in the displayed image. Therefore, it is necessary to perform a brightness-smoothing treatment on those pixels near the brightness-enhancing threshold value (near the "h" point).

As shown in the figure, the abscissa represents inputted grayscale (brightness) of all pixels in the displayed image, and the ordinate shows outputted grayscale (brightness) of all pixels in the display image. The brightness-smoothing treatment is implemented by choosing a lower smooth-treatment brightness value for the pixel whose brightness is lower than the brightness-enhancing threshold value (for example, point B in FIG. 4), and choosing a higher smooth-treatment brightness value for the pixel whose brightness is higher than the brightness-enhancing threshold value (for example, point A in FIG. 4), and then forming a parabolic curve "d" that passes through the point B and A and opens upward. Since along the parabolic curve "d" the increase rate of the brightness of the pixels changes relatively slowly, the problem where the increase rate of the brightness of the pixels near the brightness-enhancing threshold value (near the "h" point) changes dramatically is overcome, thereby solving the color shifting problem occurring in the displayed image.

As described above, the video processing method of the present invention first performs the brightness-reducing treatment, and then performs the brightness-enhancing treatment so as to keep the brightness of all pixels from being out of the range of grayscale, and further performs brightness-smoothing treatment to solve the color shifting problem occurring in the displayed image.

Figure 6:
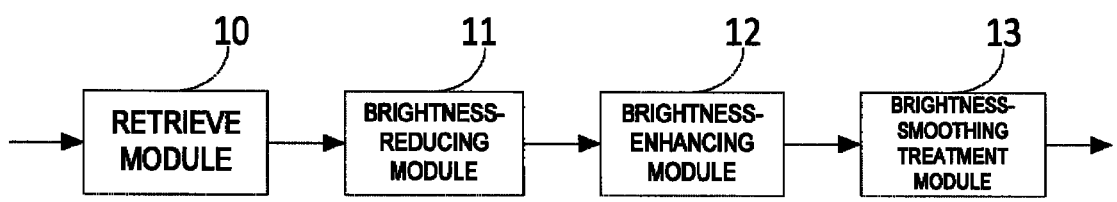
FIG. 6 is a structural schematic diagram of a video processing apparatus according to a preferred embodiment of the present invention.

Please refer to FIG. 6, which is a structural schematic diagram of a video processing apparatus according to a preferred embodiment of the present invention.

The present invention further provides a video processing apparatus which has a retrieve module 10, a brightness-reducing module 11, a brightness-enhancing module 12 and a brightness-smoothing treatment module 13.

The retrieve module 10 is able to retrieve a pixel-brightness average value, the brightest pixel and a brightness-enhancing threshold value based on the brightness value of all pixels in a displayed image, and retrieve the number of low-brightness pixels based on the brightness value of all pixels and the brightness-distinguishing setting value; wherein the low-brightness pixel is a pixel having a brightness value lower than the brightness-distinguishing setting value.

The brightness-reducing module 11 is able to perform a brightness-reducing treatment on the brightness of all pixels in the displayed image based on the pixel brightness average value and the number of the low-brightness pixels.

The brightness-enhancing module 12 is able to perform a brightness-enhancing treatment on all first pixels in the displayed image based on the brightness of the brightest pixel and the pixel brightness average value, wherein the first pixels are pixels having a brightness value higher than the brightness-enhancing threshold value.

The brightness-smoothing treatment module 13 is used to set a higher smooth-treatment brightness value and a lower smooth-treatment brightness value to perform a brightness-smoothing treatment on the pixels which have a brightness value being between the higher smooth-treatment brightness value and the lower smooth-treatment brightness value; wherein the higher smooth-treatment brightness value is higher than the brightness-enhancing threshold value, and the lower smooth-treatment brightness value is lower than the brightness-enhancing threshold value.

Preferably, the specific process performed by the brightness-reducing module 11 may be as follows:

When the number of low-brightness pixels is greater than the number setting value, the brightness-reducing module 11 then uses the first setting attenuation coefficient to perform the brightness-reducing treatment on all pixels in the displayed image; when the number of low-brightness pixels is less than or equal to the number setting value, the brightness-reducing module 11 then determines an attenuation coefficient based on the pixel brightness average value and uses the attenuation coefficient to perform the brightness-reducing treatment on all pixels in the displayed image.

Preferably, the specific process performed by the brightness-reducing module 11 is as follows: presetting a first average threshold value and a second average threshold value; comparing the pixel brightness average value respectively with the first average threshold value and the second average threshold value, wherein when the pixel brightness average value is less than or equal to the first average threshold value, the attenuation coefficient is a second setting attenuation coefficient; or when the pixel brightness average value is greater than the first average threshold value and less than the second average threshold value, a coefficient of proportionality representing the attenuation coefficient changes in proportion with the pixel brightness average value is represented as the following formula 2:

$$(1-m)/(g2-g1);\quad \text{Formula (2), wherein}$$

"g1" is the first average threshold value; g2 is the second average threshold value, wherein g2>g1; m is the second setting attenuation coefficient, wherein 0<m<1.

When the pixel brightness average value is greater than or equal to the second average threshold value, the attenuation coefficient is 1.

Preferably, the specific process performed by the brightness-enhancing module 12 is as follows:

When the brightness value of the brightest pixel is less than or equal to the first brightness threshold value, the brightness-enhancing module 12 sets a gain coefficient to perform a brightness-enhancing treatment on all first pixels in the displayed image.

When the brightness value of the brightest pixel is greater than the first brightness threshold value, the brightness-enhancing module 12 determines the gain coefficient based on the pixel brightness average value and uses the gain coefficient to perform the brightness-enhancing treatment on all the first pixels in the displayed image.

The video processing apparatus of the present invention can achieve any one of the aforementioned embodiments of the video processing methods. Those embodiments have been described in the above description and therefore not described in detail again to avoid redundancy.

As described above, the video processing method of the present invention first performs the brightness-reducing treatment, and then performs the brightness-enhancing treatment so as to keep the brightness of all pixels from being out of the range of grayscale, and further performs brightness-smoothing treatment to solve the color shifting problem occurring in the displayed image.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A video processing method comprising steps of:
   obtaining a pixel-brightness average value, a brightest pixel and a brightness-enhancing threshold value based on the brightness value of all pixels in a displayed image; and obtaining the number of low-brightness pixels according to the brightness value of all the pixels in the displayed image and a brightness-distinguishing setting value, wherein the low-brightness pixels are pixels having a brightness value less than the brightness-distinguishing setting value;
   using a first setting attenuation coefficient to perform a brightness-reducing treatment on all the pixels in the displayed image when the number of the low-brightness pixels is greater than a predetermined number setting value;
   determining an attenuation coefficient based on the pixel brightness average value and using the attenuation coefficient to perform a brightness-reducing treatment on all the pixels in the displayed image when the number of the low-brightness pixels is less than or equal to the predetermined number setting value;
   using a preset gain coefficient to perform a brightness-enhancing treatment on all first pixels in the displayed image when the brightness value of the brightest pixel is less than or equal to the first brightness threshold value; wherein the first pixels belong to the pixels in the displayed image, wherein the first pixels are pixels having a brightness value being greater than the brightness-enhancing threshold value;
   determining a gain coefficient based on the pixel brightness average value and using the gain coefficient to perform the brightness-enhancing treatment on all the first pixels when the brightness value of the brightest pixel is greater than the first brightness threshold value; and
   respectively setting a higher smooth-treatment brightness value and a lower smooth-treatment brightness value and performing a brightness-smoothing treatment on pixels having a brightness value being between the higher smooth-treatment brightness value and the lower smooth-treatment brightness value; wherein the higher smooth-treatment brightness value is greater than the brightness-enhancing threshold value, and the lower smooth-treatment brightness value is less than the brightness-enhancing threshold value.

2. The video processing method as claimed in claim 1, wherein the step of determining the attenuation coefficient based on the pixel brightness average value further includes steps of:
   presetting a first average threshold value and a second average threshold value;
   comparing the pixel brightness average value respectively with the first average threshold value and the second average threshold value, wherein
   when the pixel brightness average value is less than or equal to the first average threshold value, the attenuation coefficient is a preset second setting attenuation coefficient; or
   when the pixel brightness average value is greater than the first average threshold value and less than the second average threshold value, a coefficient of proportionality representing the attenuation coefficient changes in proportion with the pixel brightness average value is represented as:

$$(1-m)/(g2-g1);\text{ wherein}$$

g1 is the first average threshold value; g2 is the second average threshold value, wherein g2>g1; and m is the second setting attenuation coefficient, wherein 0<m<1; or
   when the pixel brightness average value is greater than or equal to the second average threshold value, the attenuation coefficient is equal to 1.

3. The video processing method as claimed in claim 1, wherein the step of determining the gain coefficient based on the pixel brightness average value further includes steps of:
   presetting a first average threshold value and a second average threshold value;
   comparing the pixel brightness average value respectively with the first average threshold value and the second average threshold value, wherein
   when the pixel brightness average value is less than or equal to the first average threshold value, the gain coefficient has a preset maximum value; or
   when the pixel brightness average value is greater than the first average threshold value and is less than the second average threshold value, a coefficient of proportionality representing the gain coefficient changes in proportion with the pixel brightness average value is represented as:

$$(1-gmax)/(g2-g1);\text{ wherein}$$

g1 is the first average threshold value; g2 is the second average threshold value, wherein g2>g1; gmax is the preset maximum value of the gain coefficient, wherein gmax>1; or when the pixel brightness average value is greater than or equal to the second average threshold value, the gain coefficient is equal to 1.

4. The video processing method as claimed in claim 1, wherein when the first brightness threshold value is greater than the brightness value of the brightest pixel, the range of the gain coefficient is:

$1<k<(f/n)$; or when the first brightness threshold value is less than or equal to the brightness value of the brightest pixel, the range of the gain coefficient is:

$1<k<(f/m)$; wherein k is the gain coefficient; f is the maximum brightness value a display apparatus has; m is the brightness value of the brightest pixel; and n is the first brightness threshold value.

5. A video processing method comprising steps of:
obtaining a pixel-brightness average value, a brightest pixel and a brightness-enhancing threshold value based on the brightness value of all pixels in a displayed image; and obtaining the number of low-brightness pixels according to the brightness value of all the pixels in the displayed image and a brightness-distinguishing setting value, wherein the low-brightness pixels are pixels having a brightness value less than the brightness-distinguishing setting value;
performing a brightness-reducing treatment on all the pixels in the displayed image based on the pixel brightness average value and the number of the low-brightness pixels;
performing a brightness-enhancing treatment on all first pixels in the displayed image based on the brightness value of the brightest pixel and the pixel brightness average value, wherein the first pixels belong to the pixels in the displayed image, wherein the first pixels are pixels having a brightness value being greater than the brightness-enhancing threshold value; and
respectively setting a higher smooth-treatment brightness value and a lower smooth-treatment brightness value and performing a brightness-smoothing treatment on pixels having a brightness value being between the higher smooth-treatment brightness value and the lower smooth-treatment brightness value; wherein the higher smooth-treatment brightness value is greater than the brightness-enhancing threshold value, and the lower smooth-treatment brightness value is less than the brightness-enhancing threshold value.

6. The video processing method as claimed in claim 5, wherein the step of performing the brightness-reducing treatment on all the pixels in the displayed image further includes steps of:
when the number of the low-brightness pixels is greater than a presetting number setting value, using a presetting first setting attenuation coefficient to perform the brightness-reducing treatment on all the pixels in the displayed image; or
when the number of the low-brightness pixels is less than or equal to the number setting value, determining an attenuation coefficient based on the pixel brightness average value and using the attenuation coefficient to perform the brightness-reducing treatment on all the pixels in the displayed image.

7. The video processing method as claimed in claim 6, wherein the step of determining the attenuation coefficient based on the pixel brightness average value further include steps of:
presetting a first average threshold value and a second average threshold value;
comparing the pixel brightness average value respectively with the first average threshold value and the second average threshold value, wherein
when the pixel brightness average value is less than or equal to the first average threshold value, the attenuation coefficient is equal to the second setting attenuation coefficient;
when the pixel brightness average value is greater than the first average threshold value and less than the second average threshold value, a coefficient of proportionality representing the attenuation coefficient changes in proportion with the pixel brightness average value is represented as:

$(1-m)/(g2-g1)$;

g1 is the first average threshold value; g2 is the second average threshold value, wherein g2>g1; and m is the second setting attenuation coefficient, wherein 0<m<1; or when the pixel brightness average value is greater than or equal to the second average threshold value, the attenuation coefficient is equal to 1.

8. The video processing method as claimed in claim 5, wherein the step of performing the brightness-enhancing treatment on all first pixels in the displayed image further includes steps of:
when the brightness value of the brightest pixel is less than or equal to the first brightness threshold value, using a preset gain coefficient to perform a brightness-enhancing treatment on all first pixels in the displayed image; or
when the brightness value of the brightest pixel is greater than the first brightness threshold value, determining a gain coefficient based on the pixel brightness average value and using the gain coefficient to perform the brightness-enhancing treatment on all the first pixels.

9. The video processing method as claimed in claim 8, wherein the step of determining the gain coefficient based on the pixel brightness average value further includes steps of:
presetting a first average threshold value and a second average threshold value;
comparing the pixel brightness average value respectively with the first average threshold value and the second average threshold value, wherein
when the pixel brightness average value is less than or equal to the first average threshold value, the gain coefficient is a preset maximum value; or
when the pixel brightness average value is greater than the first average threshold value and less than the second average threshold value, a coefficient of proportionality representing the gain coefficient changes in proportion with the pixel brightness average value is represented as:

$(1-gmax)/(g2-g1)$; wherein g1 is the first average threshold value; g2 is the second average threshold value, wherein g2>g1; gmax is the preset maximum value of the gain coefficient, wherein gmax>1; or when the pixel brightness average value is greater than or equal to the second average threshold value, the gain coefficient is equal to 1.

10. The video processing method as claimed in claim 8, wherein when the first brightness threshold value is greater than the brightness value of the brightest pixel, the range of the gain coefficient is:

$1 < k < (f/n)$; or when the first brightness threshold value is less than or equal to the brightness value of the brightest pixel, the range of the gain coefficient is:

$1 < k < (f/m)$; wherein k is the gain coefficient; f is the maximum brightness value a display apparatus has; m is the brightness value of the brightest pixel; and n is the first brightness threshold value.

\* \* \* \* \*